March 28, 1967  D. E. JONES, SR  3,311,246
CAR TOP BOAT LOADER
Filed Oct. 18, 1965
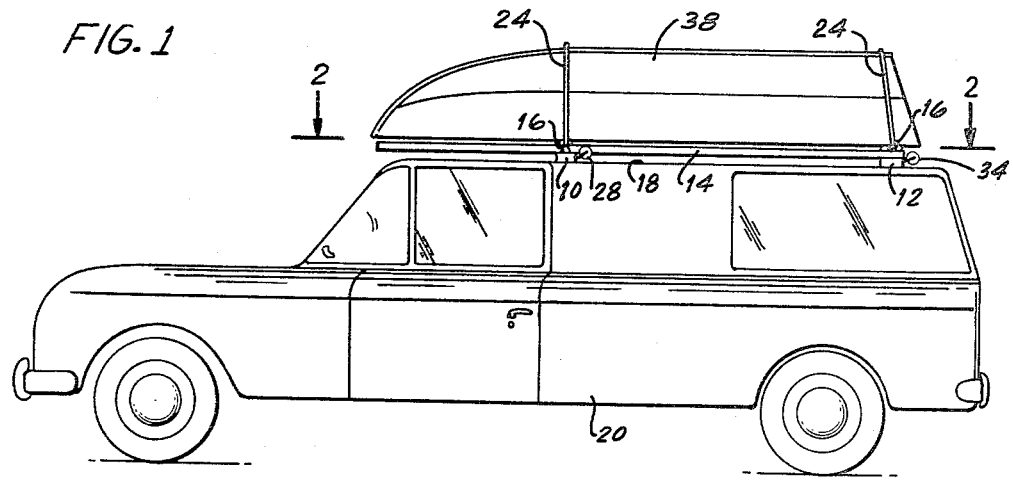
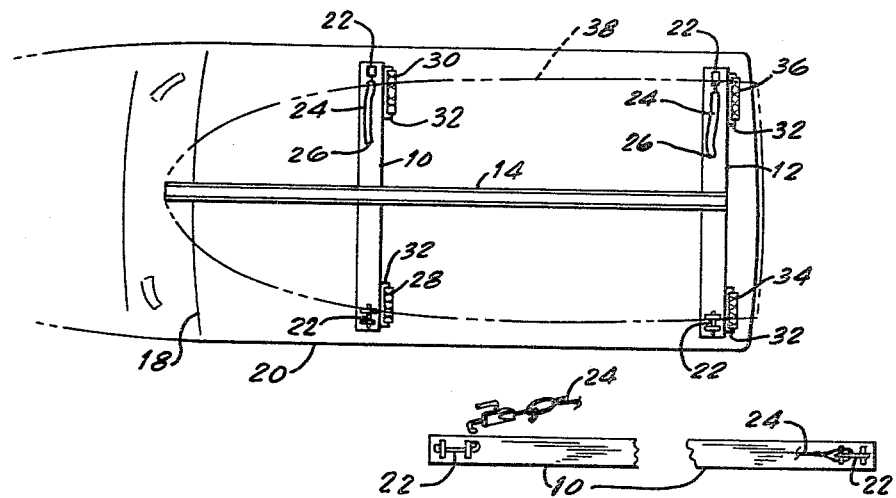
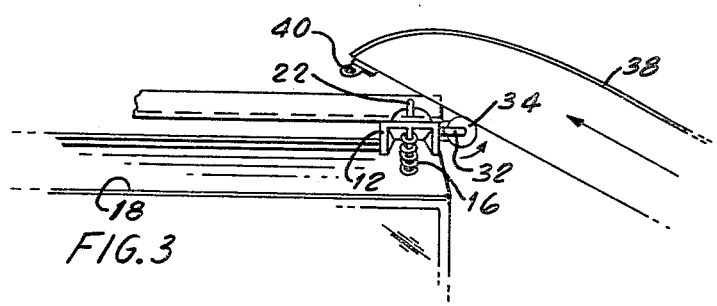
INVENTOR.
DAVID E. JONES, SR.

United States Patent Office 3,311,246
Patented Mar. 28, 1967

3,311,246
CAR TOP BOAT LOADER
David E. Jones, Sr., P.O. Box 222,
Keyes, Calif. 95328
Filed Oct. 18, 1965, Ser. No. 497,005
3 Claims. (Cl. 214—450)

My invention is directed toward a car top boat loader which, when installed on the roof of an automobile, trailer, panel truck or similar vehicle, permits a boat to be carried from place to place by the vehicle.

Accordingly, it is an object of my invention to provide a new and improved car top boat loader which permits the boat to be loaded onto the roof of a vehicle, secured thereon, transported and subsequently unloaded as a one man operation.

Another object is to provide a new and improved car top boat loader which is simple in construction and which is easy to install and easy to remove from the roof of a vehicle.

Still another object is to provide a new and improved car top boat loader which can be manufactured easily and inexpensively.

All of the foregoing and still further objects and advantages of my invention will either be explained with reference both to this specification and to the accompanying drawings wherein:

FIG. 1 is a side view of my car top boat loader as installed on the roof of a vehicle;

FIG. 2 is a top view thereof;

FIG. 3 is a detail perspective view illustrating loading of a boat onto the roof of a vehicle in accordance with my invention; and FIG. 4 is a detail view of the boat securing means employed in my invention.

Referring now to FIGS. 1–4, there is shown parallel horizontal front and rear metal members 10 and 12 having in cross section the shape of an inverted U and joined at their mid-points by an elongated transversely extending horizontal elongated channel 14 having in cross section the shape of an upright U. The rear end of channel 14 is coincident with member 12, the front end extends beyond member 10 to the front of the automobile 20. Mounting bolt-and-spring units 16 are attached to each end of each member 10 and 12 and are bolted down through appropriate holes in the roof 18 of an automobile 20 with channel 14 extending parallel to the longitudinal extension of the roof and members 10 and 12 being positioned respectively adjacent the front and rear of the vehicle. The bolt-and-spring units provide resiliently yielding support for the members 10 and 12, and for the boat, and thus act to absorb shocks.

Each end of each member 10 and 12 carries on the top end thereof a string tension hook 22. First and second soft lead cables 24 carry at least one end thereof a brownie or other clamp 26, whereby each cable can be secured detachably to a corresponding one of members 10 and 12 by attaching the appropriate clamps to the appropriate hooks.

First and second horizontal rubber rollers 28 and 30 are secured to the rear side of member 10 by axial eye bolts 32 whereby these rollers are rotatable separately about a common axis parallel to member 10. Third and fourth horizontal rollers 34 and 36 are secured to the rear side of member 12 by axial eye bolts 32 in like manner and are rotatable separately about a common axis parallel to member 12.

In use, the boat 38 to be loaded is inverted and moved onto rollers 34 and 36 with the prow forward and the prow boat hook 40 riding within channel 14. The boat is then pushed forward and upward, being guided by channel 14 with hook 40 therein until the boat rides on all four rollers 28, 30, 34 and 36. The boat is moved into final position with hook 40 adjacent the front of the automobile. Cables 24 are then secured to the appropriate members to hold the boat in position. Unloading is readily accomplished by reversing the above process.

While I have described my invention with particular reference to the drawings, my protection is to be limited only by the terms of the claims which follow.

Having thus described my invention, I claim as new and desire to secure by Letters Patent:

1. Apparatus for loading boats and the like on top of an automobile and the like, said apparatus comprising first and second parallel horizontal members securable to said automobile top adjacent the front and rear respectively of the said top and extending transversely of the longitudinal direction of the said top, a channel extending horizontally between the midpoints of said transversely extending member parallel to said longitudinal direction, one end of said channel terminating at the rear one of said members, the other end extending beyond said front one of said members, said channel in cross section having the shape of a U, four separate mounting bolt and spring units, each unit being secured to an adjacent end of one of said transversely extending members, means securing said units to said top, a first pair of spaced apart horizontal rollers rotatable about a common axis parallel to said transversely extending members and secured to the rear side of the front one of said transversely extending members, and a second pair of spaced apart horizontal rollers rotatable about a common axis parallel to said transversely extending members and secured to the rear side of the rear one of said transversely extending members.

2. Apparatus for loading boats and the like on top of an automobile and the like, said apparatus comprising first and second parallel horizontal members securable to said automobile top adjacent the front and rear respectively of said top and extending transversely of the longitudinal direction of the said top, a channel extending horizontally between the midpoints of said transversely extending members parallel to said longitudinal direction, one end of said channel terminating at the rear one of said members, the other end extending beyond said front one of said members, said channel in cross section having the shape of a U, four separate mounting bolt-and-spring units, each unit being secured to an adjacent end of one of said transversely extending members, means securing said units to said top, a first pair of spaced apart horizontal rollers rotatable about a common axis parallel to said transversely extending members and secured to the rear side of the front one of said transversely extending members, a second pair of spaced apart horizontal rollers rotatable about a common axis parallel to said transversely extending members and secured to the rear side of the rear one of said transversely extending members, four spring tension hooks, means securing each hook to the top surface of an adjacent end of one of said transversely extending members, the means securing at least one of said hooks of each of said front and rear transversely extending members being detachable.

3. Apparatus as set forth in claim 2 wherein each of said securing means includes a flexible cable.

References Cited by the Examiner
UNITED STATES PATENTS

| | | | |
|---|---|---|---|
| 2,539,997 | 1/1951 | Graves | 224—42.1 |
| 2,575,458 | 11/1951 | Merrill | 224—42.1 |
| 2,654,515 | 10/1953 | Svoboda | 224—42.1 |
| 2,859,887 | 11/1958 | Haight | 224—42.1 X |
| 2,889,945 | 6/1959 | Holsclaw | 214—84 |

GERALD M. FORLENZA, *Primary Examiner.*

F. WERNER, *Assistant Examiner.*